United States Patent [19]

Bernard et al.

[11] Patent Number: 4,741,226
[45] Date of Patent: May 3, 1988

[54] POWER FEED

[75] Inventors: David A. Bernard; William C. Christian, both of Ashland, Oreg.

[73] Assignee: Darex Corporation, Ashland, Oreg.

[21] Appl. No.: 926,550

[22] Filed: Nov. 4, 1986

[51] Int. Cl.⁴ ............... F16H 49/00; B23B 47/00; B23G 3/08

[52] U.S. Cl. ............... 74/625; 192/56 R; 192/67 R; 408/129

[58] Field of Search .................. 74/625, 412 TA; 408/129, 132, 136; 192/67 R, 56 R, 99 A, 95, 114

[56] References Cited

U.S. PATENT DOCUMENTS

| | | | |
|---|---|---|---|
| 1,210,969 | 1/1917 | Niedergesaess | 192/67 R |
| 1,576,110 | 3/1926 | Galloway et al. | 408/132 |
| 2,401,276 | 5/1946 | Schauer et al. | 408/129 |
| 2,488,231 | 11/1949 | Pegard | 192/67 R |
| 2,539,468 | 1/1951 | Pihl . | |
| 2,579,459 | 12/1951 | Allen . | |
| 2,807,176 | 9/1957 | Butcher et al. . | |
| 2,882,761 | 4/1959 | Knosp et al. . | |
| 2,978,872 | 4/1961 | Curran et al. . | |
| 3,118,325 | 1/1964 | Pettigrew | 192/93 |
| 3,132,730 | 5/1964 | Dahlstrand et al. . | |
| 3,129,613 | 4/1964 | Burg . | |
| 3,398,611 | 8/1968 | Hahner | 192/114 |
| 3,481,438 | 12/1969 | Warrick et al. . | |
| 3,523,470 | 8/1970 | Miller . | |
| 3,626,721 | 12/1971 | Koen . | |
| 4,543,074 | 9/1985 | Ville et al. | 192/56 R |
| 4,570,776 | 2/1986 | Iwashita | 192/114 R |
| 4,644,811 | 2/1987 | Tervo | 74/412 TA |

FOREIGN PATENT DOCUMENTS

| | | | |
|---|---|---|---|
| 0852456 | 8/1981 | U.S.S.R. | 408/129 |
| 0933292 | 6/1982 | U.S.S.R. | 408/129 |

Primary Examiner—Lawrence J. Staab
Attorney, Agent, or Firm—Kerkam, Stowell, Kondracki & Clarke

[57] ABSTRACT

A substantially universal power feed for a drilling machine has a unique clutching arrangement whereby overloads are substantially eliminated. A further safety feature comprises a shear plate which functions to stop rotation of the power feed in the event of clutch malfunction or over adjustment of the clutch release spring. The power feed is also of the type that the feeders arbor may be rotated with the clutch disengaged from the motor so that the operator has a choice of using the power feed or manually feeding the drill without the necessity of physically removing the power feed from the drilling machine.

9 Claims, 7 Drawing Sheets

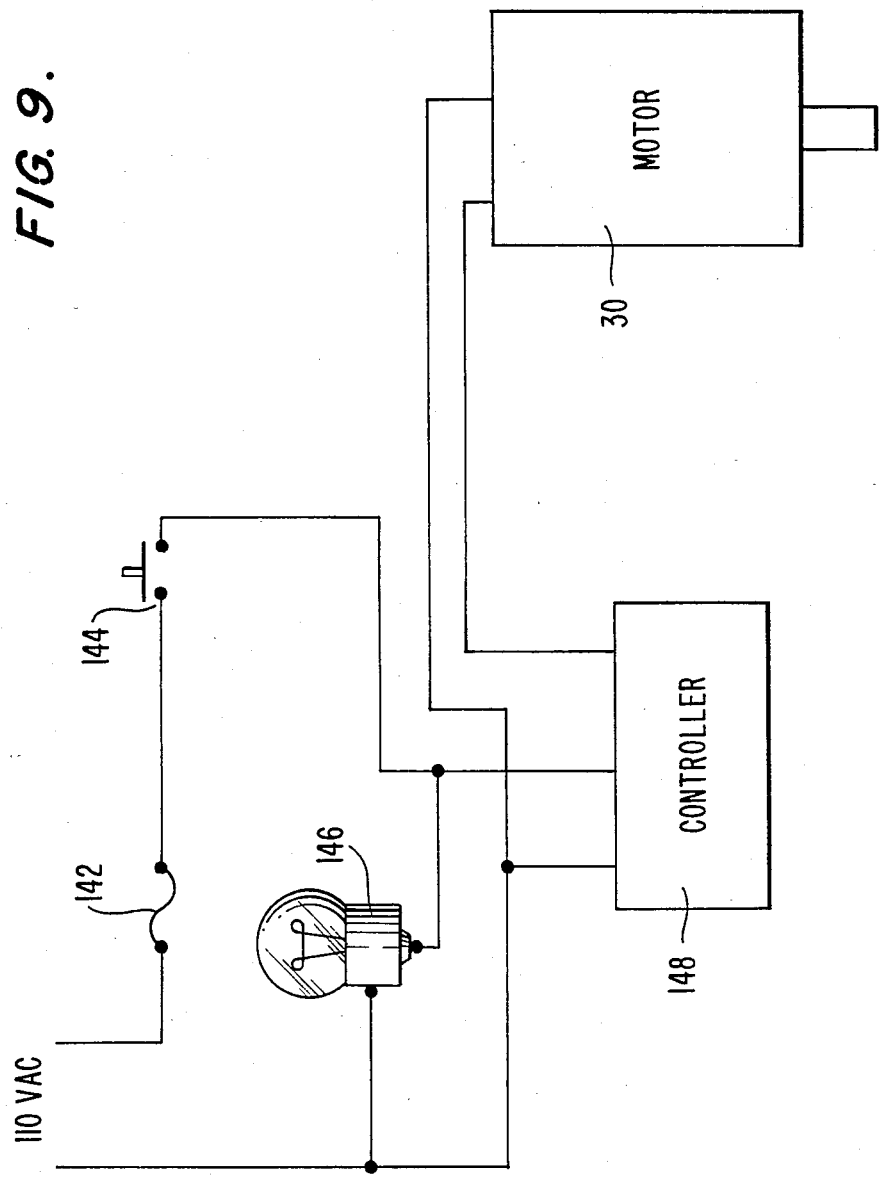

POWER FEED

This invention relates to a substantially universal drilling machine power feed that is attachable to many makes and forms of drills and converts such drills into substantially automatic operation.

BACKGROUND OF THE INVENTION

Drill presses are one of the oldest, and still most often used machine tool. The level of productivity of a drill press is usually taken for granted. Most operators are aware that a power feed on a drill press could increase its productivity and reduce operator fatigue, yet few drill presses have power feeds. Old design power feeds have been found to be difficult to mount and hard to set up and often if an operator wished to use the drill press manually, the power feed must be removed. Further, many of the old design power feeds do not "feel" the work so that if a drill gets dull or loaded with chips, the power feed contiues to feed, often resulting in drill breakage. Further, a primary concern of many operators is that old design power feeds are extremely expensive.

The following patents illustrate various types of patented power feeds for drill presses:

U.S. Pat. No. 2,539,468, A. E. PIHL, et al;
U.S. Pat. No. 2,579,459, R. H. ALLEN;
U.S. Pat. No. 2,807,176, W. C. BUTCHER et al;
U.S. Pat. No. 2,882,761, R. N. KNOSP et al;
U.S. Pat. No. 2,978,872, C. F. CURRAN, Jr. et al;
U.S. Pat. No. 3,129,613, J. L. BURG;
U.S. Pat. No. 3,523,470, C. S. MILLER

THE PRESENT INVENTION

The invention may be generally defined as a universal power feed for a drilling machine comprising a housing, an electric motor attached to the housing with the output shaft of the motor projecting into the housing, a worm mounted to rotate with the motor output shaft within the housing, a drive shaft mounted in the housing and carrying a worm gear rotatable there on. The worm gear is mounted in gear engaging relation to the worm, a first clutch half mounted to rotate with the worm gear, and each end of the drive shaft having threads thereon. One of the drive shaft threads, threadably engaging a drive plate and a adaptor ring, the adaptor ring having at least two ring set screws for attaching the ring to a drilling machine hub. A power feed hub, slideably mounted on the drive shaft, a second clutch half secured to the hub and feed handles mounted on the feed hub and adapted to urge the feed hub clutch half into engagement with the worm gear clutch half.

The invention also includes a controller for the drive motor and may include an electronic chip breaker means whereby the drive motor for the drill press feed is intermittently stopped and started during the drilling operation.

The invention will be more particularly described in reference to the accompanying drawings wherein:

FIG. 9 illustrates another form of the invention, in block form, electric circuitry for the power feed attachment.

DETAILED DESCRIPTION OF THE INVENTION

Figure 2:
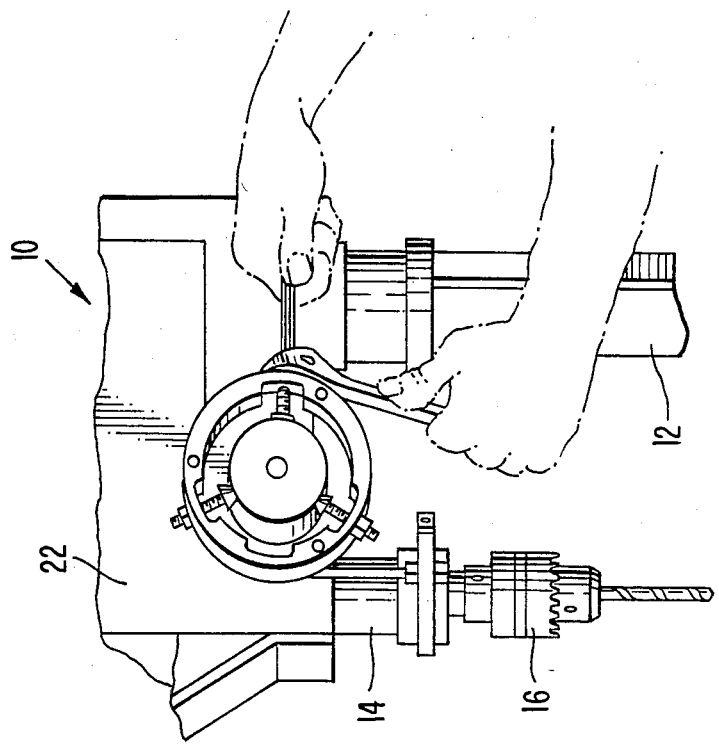
FIG. 2 illustrates attaching the drive ring of the power feed means to the hub of a conventional drill press.
Figure 1:
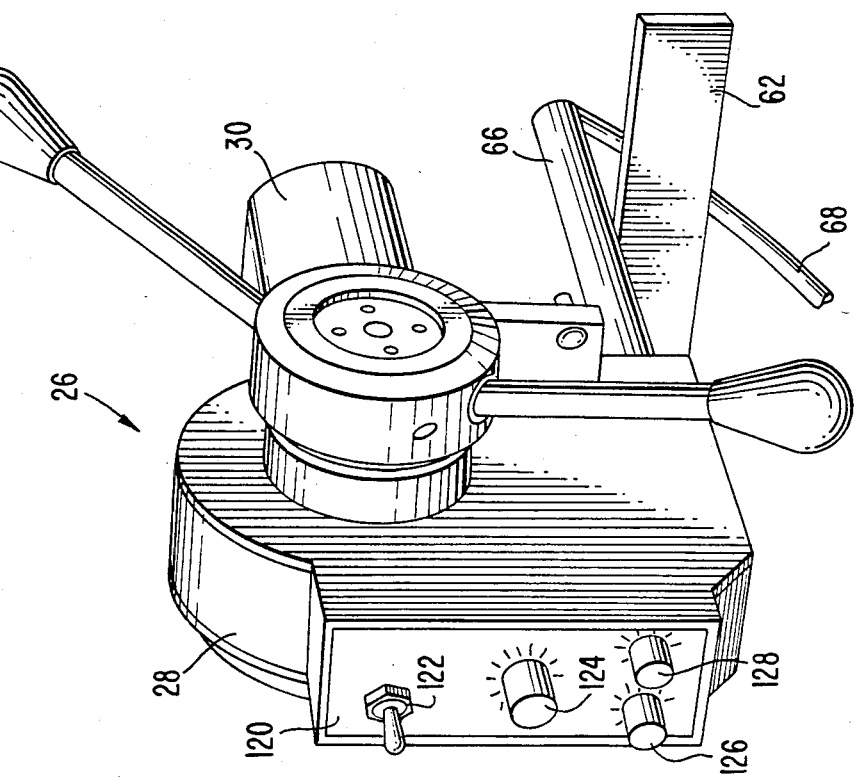
FIG. 1 is a perspective view of an embodiment of the present invention.

In the drawings 10 generally designates a typical drill press having a vertical support column 12, a quill 14, to the lower end of which is secured a conventional chuck 16. Movement of the quill 14 in a downward direction is controlled by the drill press hub 18 to which is attached 2, 3, or 4 handles not shown in the drawings. As is conventional, the drill press includes quill feed stop means generally designated 20 so that the depth of downward movement of the quill shaft may be arrested where desired. Upward movement of the quill shaft is controlled by a spring not shown mounted within the drill press enclosure 22. The power source for the drill press is shown at 24.

The power feed of the invention is generally designated 26. The power feed includes a cast housing 28 to which is attached an electric motor 30 having an output shaft 32 to which is mounted a gear train generally designated 31. The last shaft of the gear train 31 designated 32 mounts a worm 34 within the housing 28. The worm meshes with a large worm gear 38. The worm gear rotates on a bearings 39 and 113 adjacent drive shaft 42, having threaded rearward end 44 and threaded forward end 46.

An adaptor plate 48 is threadedly mounted to threads 44 of stub shaft 42 via adaptor plate shear bushing 50 the function of which is to prevent damage to the power feed in the event the power feed is overstressed. The shear bushing 50 is mounted to the adaptor plate by a plurality of studs 52. The adaptor plate 48 is also screw mounted to a novel adaptor ring 54. The adaptor ring 54 is provided with three ring set screws 56.

Figure 3:
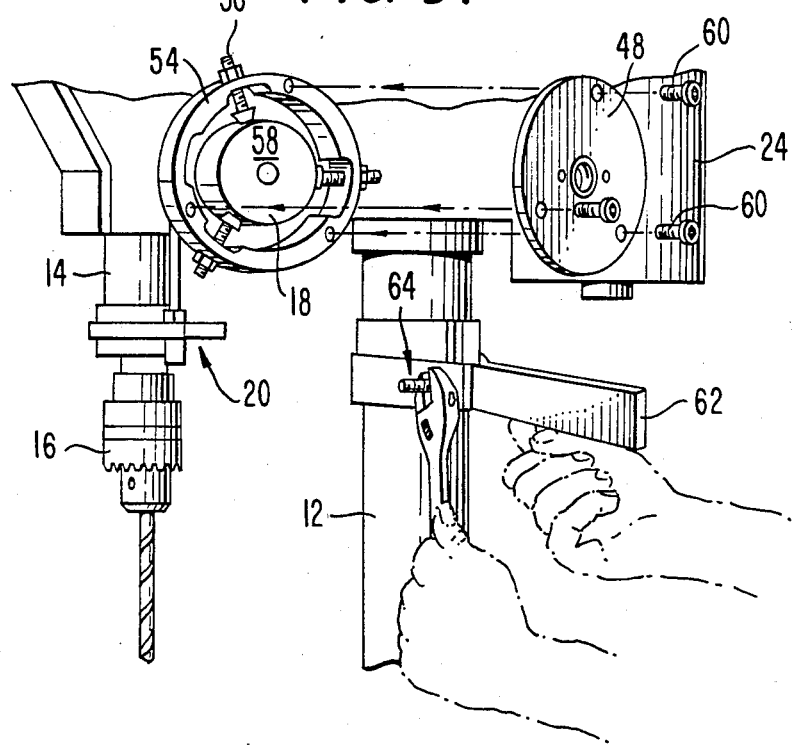
FIG. 3 is a view like FIG. 2 showing attachment of the drive plate of the feeder to the attaching ring and attaching a stop or rest member to the column of a conventional drill press.
Figure 4:
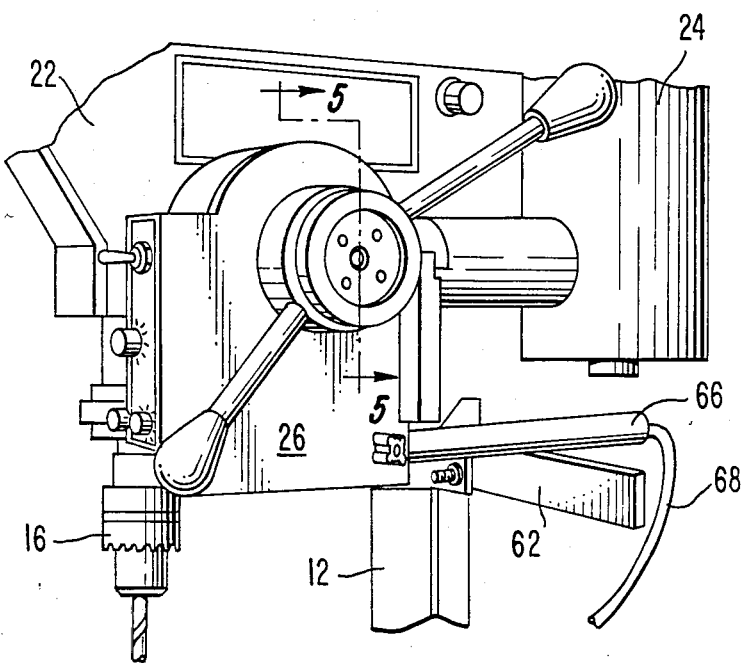
FIG. 4 illustrates the attached universal power feed to a conventional drill press.

The ring set screws 56 are threaded into bores in the adaptor ring such that three of the set screws are used to mount the ring 54 to the drill press hub 58 on drill presses having three quill feed handles whereas drill press quill feed hubs having two handles or four handles only two of the set screws are employed. In order to mount the adaptor ring 54 to the quill feed hub 58 of the drill press, the drill press handles are removed and the appropriate number of ring set screws are used with bushings 40. Thereafter, the adaptor plate 48 is screwed to the ring via screws 60 best seen in FIGS. 3 with the plate 48 mounted to the adaptor ring 54 the housing 28 with its drive shaft 42 is screwed to the adaptor ring 48, thus mounting the drill press power feed to the drill press hub.

The drill press attachment is provided with a torque brace 62 which torque brace is attached to the drill press column 12 via clamping nuts and bolts generally designated 64. The torque brace is engaged by a torque arm 66 secured to the housing 26 of the attachment. The torque arm 66 is of hollow construction and also functions as a conduit for the power cord 68. The torque arm 66 in conjunction with the torque brace 62 prevents rotation of the housing during actuation of the power feed.

Figure 5:
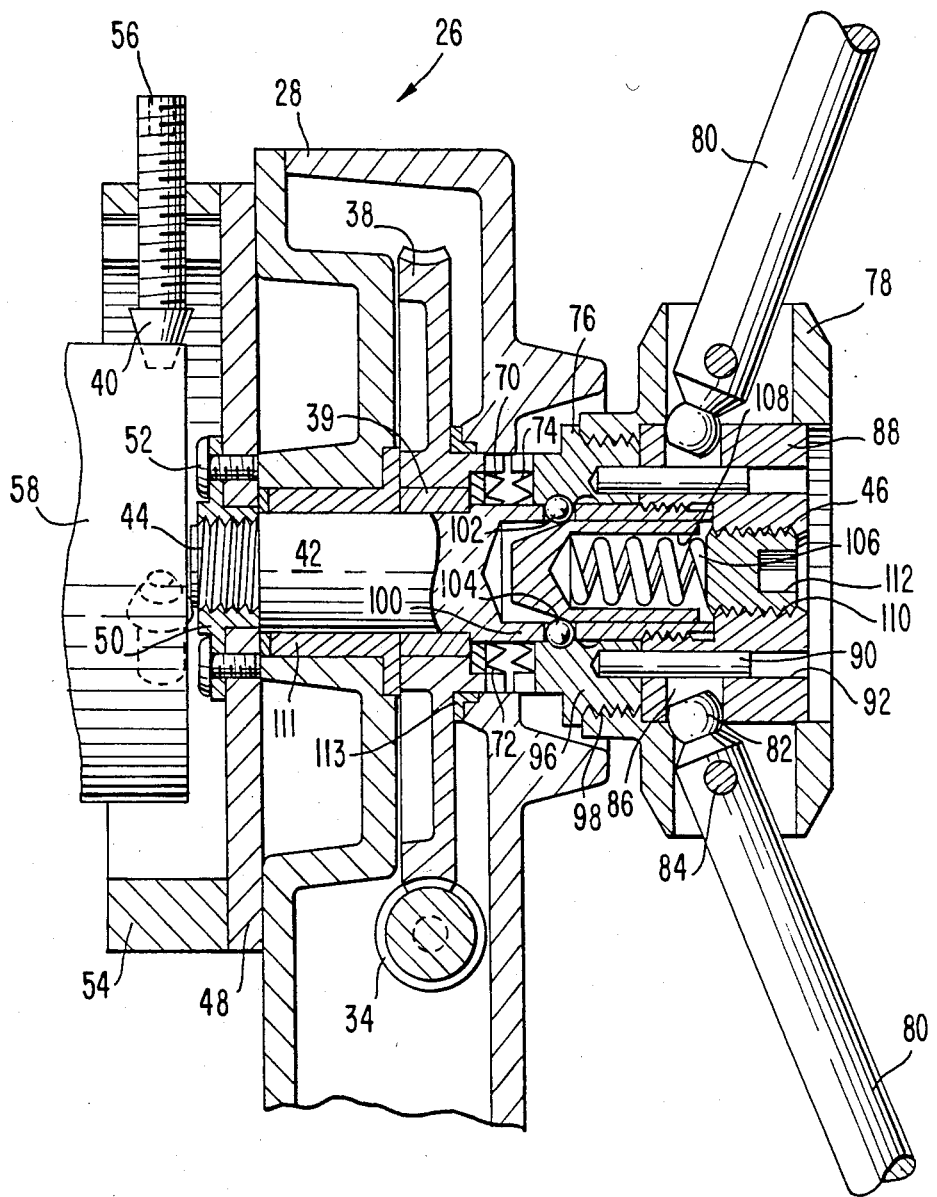
FIG. 5 is a section on line 5—5 of FIG. 4.

Rotatable with the worm gear 38 is a clutch half 70. The clutch is in the form of a toothed ring with the teeth 72 having their pointed ends directed opposite to the threaded end 44 of the shaft 42. In FIG. 5, the clutch half 70 is shown disengaged from the mating clutch half 74 associated with the main arbor 76 whereas in FIG. 6 the clutch halves 70 and 74 are in engagement.

Figure 6:
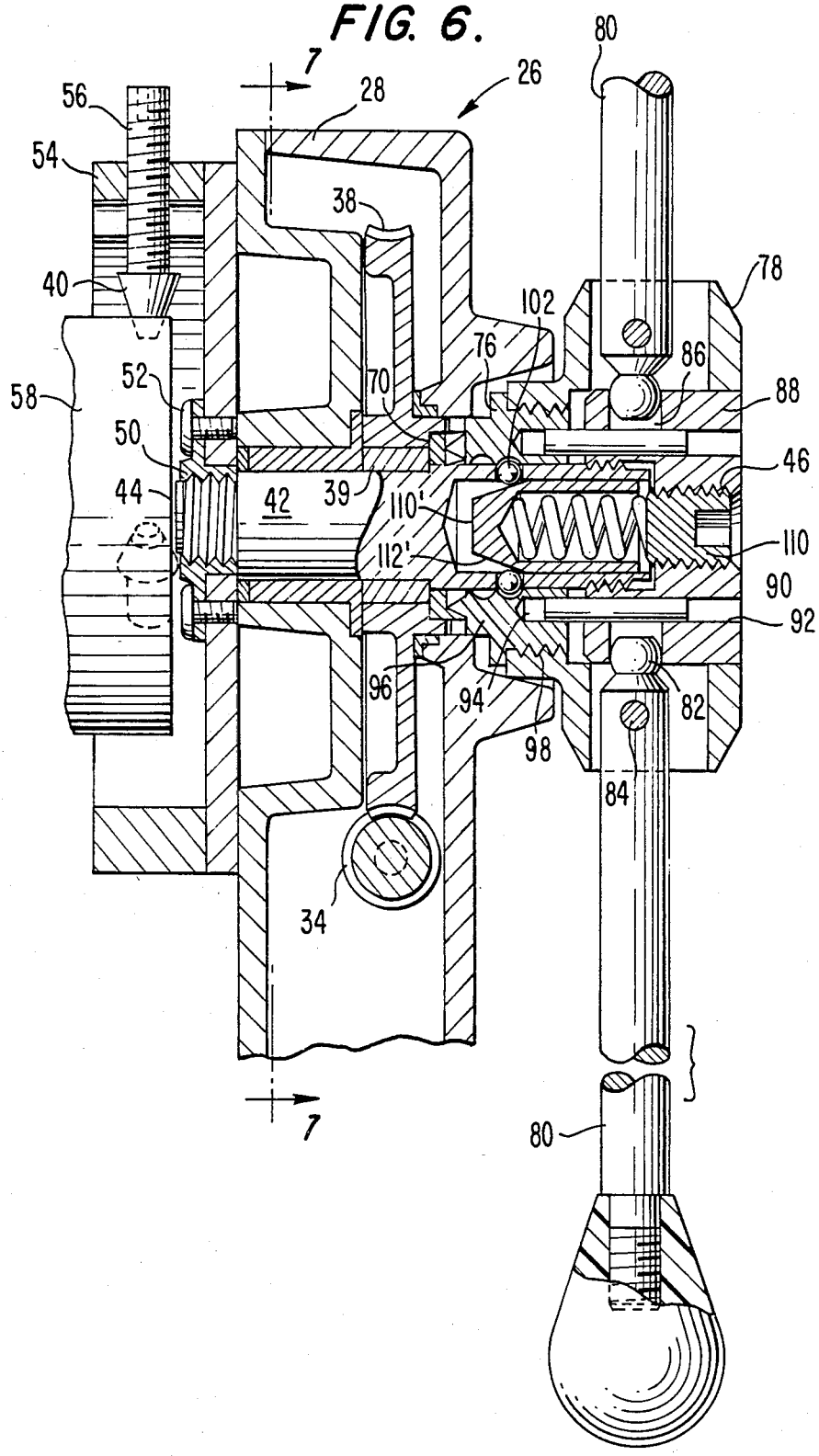
FIG. 6 is a view like FIG. 5 with the clutch means of the power feed in the clutch engaging position.

The clutch member 96 includes a hub 78 to which are pivotly mounted, a pair of handles 80. The handles 80 have truncated ball ends 82 and are pivoted to the hub 78 via pivot pins 84. The ball ends 82 of each of the handles 80 are engaged in openings 86 in a ring 88 threaded to the end of the drive shaft 42. The ring 88 is prevented from rotating within the hub 78 by control pins 90 received in bores 92 in the ring 88 and bores 94 carried by an inner fixture 96 threadedly mounted as at 98 to the inner end of hub 78. The clutch half 74 is formed integrally with the member 96 whereby when the handles 80 urge the sliding hub 78 inwardly as shown in FIG. 6, the two clutch halves 72 and 74 are engaged. The outer end 100 of the main drive shaft 42 is provided with a plurality of bores, each of which houses a ball detent 102. The balls are also received in ball pockets 104 in the element 96.

The ball detents shift from the clutch disengaged position shown in FIG. 5 to the clutch engaged position shown in FIG. 6.

A portion of the safety clutch mechanism includes a helical spring 106 retained in a bore 108 by an adjustment stud 110 having a hex opening 112 to receive a socket wrench whereby the release torque can be adjusted.

It will be particulary noted from FIGS. 5 and 6 that end 110' of the sliding gland 108 is formed as a truncated circular cone and the sloping face 112' thereof forms a means for permitting the ball detects 104 to move toward the axis of the sleeve 108 thus permitting release of the clutch. This release as herein before set forth, is controlled by the compression of the helical spring 106 which in turn is tensioned by the screw 110.

There are several forces acting on the clutch mechanism for the power feed. One of these forces is the slope of the teeth on the clutch halves 72 and 74 which when the feeder is operating, tend to force clutch half 74 away from the axillary immobile clutch half 70. The axial movement of clutch half 74 is restrained by the balls 102 in their respective sockets. As the force increases, the balls acting against the sloping face of the truncated cone 110' permits clutch release. This action by the balls 102 is resisted by the tension in spring 106 which as herein before described is adjustable via the socket 110. The unit is provided with the usual bearings as at 111 and 113.

Motor controls are on the face 120 of the housing 28. There are three dials and one switch. The switch 122 controls power to the power feeder. Dial 124 regulates the speed of the motor 30 and dials 126 and 128 function to control the time off and time on of the chip breaker on models having the chip breaker feature.

Figure 8:
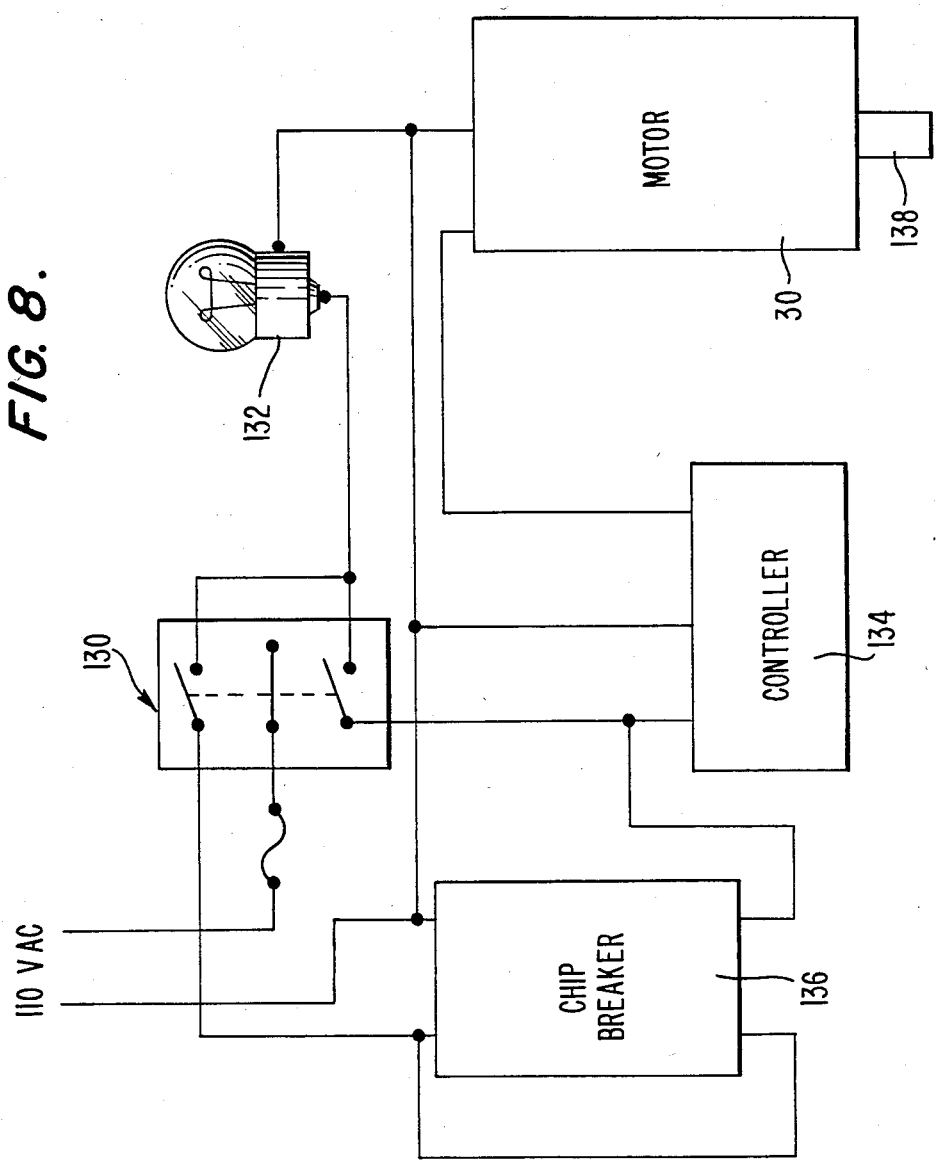
FIG. 8 illustrates one form of the invention, in block form, electric circuitry for the power feed attachment.

FIG. 8 is a digramatic showing of the electrical circuit for the form of the invention having a chip breaker. The diagram illustrates a double throw double pole switch 130, a pilot light 132, which is energized when switch 130 is closed, the speed controller 134 of commercial design, and the chip breaker, and on/off time controller 136, again of commercial design. In FIG. 8 the motor is designated 30 and has the output shaft 138.

Figure 7:
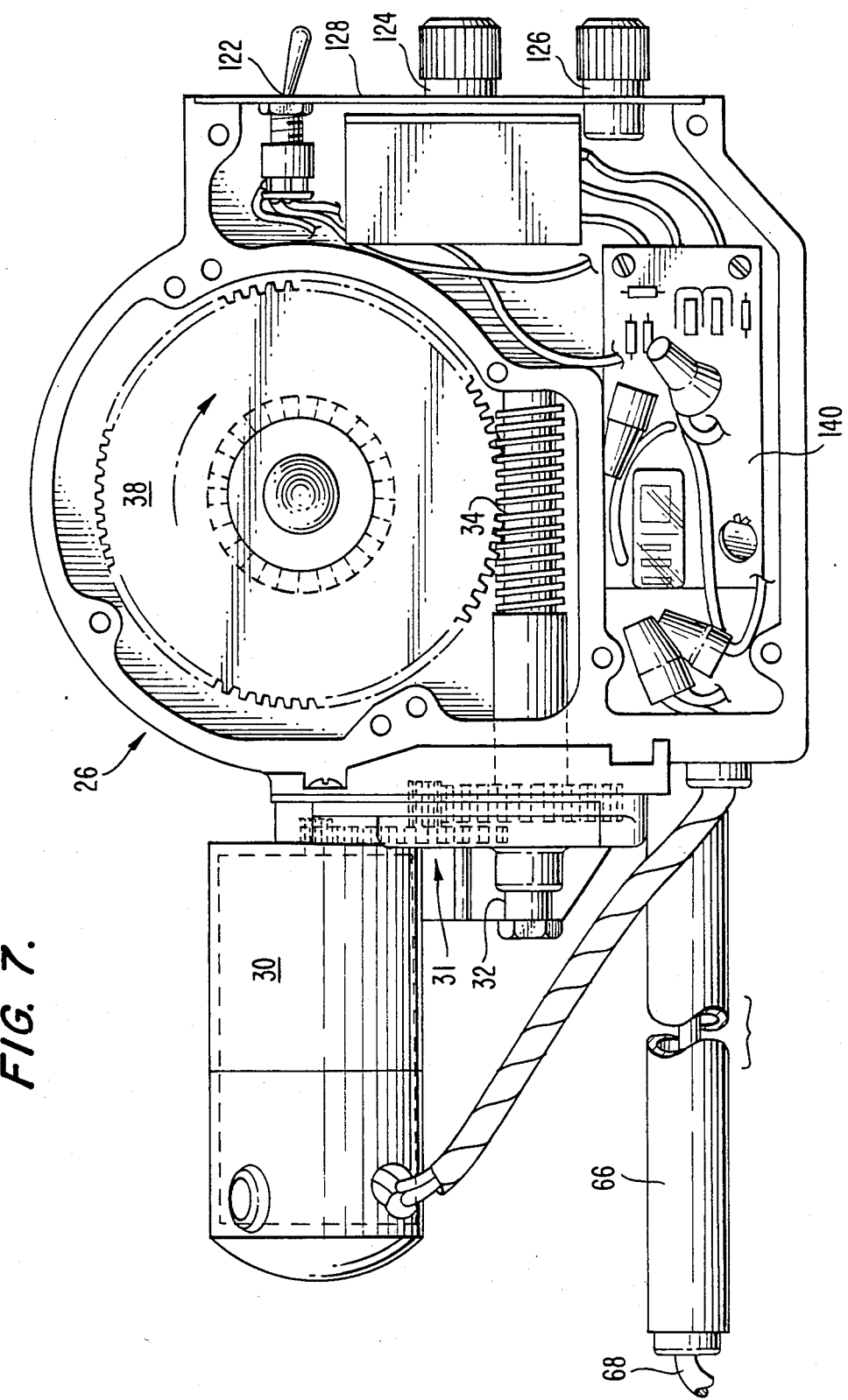
FIG. 7 is a sectional view on line 7—7 of FIG. 6.

In FIG. 7, these elements are illustrated in their relative positions within the housing of the tool and in FIG. 7 there is illustrated at 140, a circuit board for the switch speed control and chip breaker.

Referencing FIG. 9, there is shown a simplified circuitry for a form of the invention not having the time controlled chip breaker. In FIG. 9, 142 is the fuse, 144 the on/off switch, 146 the pilot light, 148 the speed controller for the motor 30.

In the event the spring tension is adjusted too high or the clutch parts fail to properly function, there is provided the small shear plate insert 50 held to the adaptor plate 48 by screws 52.

We claim:

1. A generally universal power feed for a machine used for drilling comprising a housing, an electric motor having an output shaft of the motor projecting into the housing, a worm within the housing mounted to rotate with the motor output shaft, a drive shaft mounted in the housing, a worm gear rotatable on the drive shaft in engaging relation to the worm, a first clutch half mounted to rotate with the worm gear, one end of the drive shaft provided with means for attaching a power feed to a drilling machine down feed shaft, a power feed hub slidable mounted on the other end of the drive shaft, a second clutch half secured to the feed hub, feed hub handles mounted for pivotal movement on said feed hub, and adapted in one position to urge the feed hub and the feed hub clutch half into engagement with the worm gear clutch half and in a second position to manually move the drilling machine down feed shaft; further including an axial bore in the drive shaft, a member having a conical end face slidably mounted in the drive shaft bore, a compression spring acting against the member, a plurality of detent balls, each of the balls carried by the drive shaft and engaging the conical end face of the member, said member, balls and compression spring releasably holding the clutch halves in the clutch engaging relationship.

2. The power feed as defined in claim 1 wherein the feed hub and feed hub clutch halves move axially to the clutch engage and clutch disengage positions.

3. The power feed as defined in claim 2 including a plurality of slide pins radially spaced about the axis of the drive shaft, each of said slide pins mounted in bores in the feed hub to transmit rotational torque from the feed hub to the drive shaft when the clutch halves are disengaged, and the feed handles moved in a circular path about the axis of the drive shaft.

4. The power feed as defined in claim 3 wherein the feed hub comprises an outer hub portion and a concentric inner hub portion, said outer hub portion mounted for axial sliding motion relative to the inner hub portion and said outer hub portion carrying the feed hub clutch half.

5. The power feed as defined in claim 4 wherein the feed hub handles are pivotly mounted to the outer hub portion and have ball type inner ends which engage sockets on the inner hub portion.

6. The power feed as defined in claim 5 wherein said slide pins are carried by the inner hub portion.

7. The power feed as defined in claim 1 including electric means for sequentially starting and stopping the drive motor.

8. The power feed as defined in claim 1 including a means of attaching the power feed shaft to a drill press hub consisting of a drive plate and adaptor ring having at least two set screws for attaching the ring to a drilling machine hub.

9. The power feed as defined in claim 8 further including a shear member secured to the drive plate.

* * * * *